United States Patent [19]

Johnson

[11] 4,417,416
[45] Nov. 29, 1983

[54] TREE TRANSPLANTING MACHINE

[75] Inventor: Clifton E. Johnson, Red Lake Falls, N. Mex.

[73] Assignee: Halla Nursery, Inc., Chaska, Minn.

[21] Appl. No.: 383,546

[22] Filed: Jul. 21, 1982

[51] Int. Cl.³ ............................................. A01G 13/00
[52] U.S. Cl. ..................................................... 37/2 R
[58] Field of Search ................. 37/2 R; 47/76; 111/2

[56] References Cited

U.S. PATENT DOCUMENTS

| | | | |
|---|---|---|---|
| 594,668 | 11/1897 | Wilkens | 37/2 R |
| 1,599,841 | 9/1926 | Sager | 37/2 R |
| 2,769,278 | 11/1956 | Wassell | 47/37 |
| 2,990,630 | 7/1961 | Crawford | 37/2 |
| 3,017,707 | 1/1962 | Sigler et al. | 37/2 |
| 3,017,719 | 1/1962 | Sigler et al. | 47/58 |
| 3,142,197 | 7/1964 | Le Tourneau | 74/422 |
| 3,364,601 | 1/1968 | Korenek | 37/2 |
| 3,460,277 | 8/1969 | Grover et al. | 37/2 |
| 3,558,177 | 1/1971 | Snead | 29 4/70 |
| 3,589,039 | 6/1971 | Korenek | 37/1 |
| 3,618,234 | 11/1971 | Bates | 37/2 R |
| 3,713,234 | 1/1973 | Grover et al. | 37/2 R |
| 3,936,960 | 2/1976 | Clegg | 47/76 |
| 4,067,369 | 1/1978 | Harmon | 37/2 R |
| 4,226,033 | 10/1980 | De Haan | 37/2 R |
| 4,341,025 | 7/1982 | Stocker | 37/2 R |
| 4,351,253 | 9/1982 | Dahlquist | 37/2 R |

FOREIGN PATENT DOCUMENTS

| | | | |
|---|---|---|---|
| 2353828 | 10/1975 | Fed. Rep. of Germany . | |
| 419204 | 8/1974 | U.S.S.R. | 37/2 R |

*Primary Examiner*—E. H. Eickholt
*Attorney, Agent, or Firm*—Orrin M. Haugen; Thomas J. Nikolai

[57] ABSTRACT

A truck-mounted, tree-transporting machine of the type including a plurality of powered spades which, when forced into the earth about a tree to be moved, serve to sever the roots and form a pod surrounding the tree's root ball. The pod, with the root ball encased therein, is elevated by a hydraulically operated mechanism and loaded onto the truck bed with the pod being rotated during the loading process so as to be disposed toward the front end of the truck bed, the tree branches thus extending from the rear of the truck.

6 Claims, 3 Drawing Figures

TREE TRANSPLANTING MACHINE

BACKGROUND OF THE INVENTION

I. Field of the Invention

This invention relates generally to tree transplanting apparatus and more particularly to a truck-mounted tree digging and loading mechanism which operates to position the tree's root ball at the forward end of the truck bed with the branches extending from the rear of the truck.

II. Discussion of the Prior Art

Various forms of tree transplanting machines are known in the art. For example, in the Stocker U.S. Pat. No. 4,031,637 there is described a powered tree digging machine which is adapted to be mounted on the rear of a vehicle and which includes a plurality of reciprocally movable spades which are supported by a ring stand and guided in their travel by means of upright stanchions. The mechanism for driving the spades into the ground and for retracting them to their above-ground position includes a plurality of hydraulic cylinders (two for each stanchion/blade combination) and disposed on the piston rods of the cylinders are pinion gears which cooperate with the gear teeth on racks formed on the stanchion and spades, respectively.

In operation, the operator positions the ring stand about the tree to be transplanted and then selectively operates the plural hydraulic cylinders which serve to drive the spades into the ground. The spades are curved in such a fashion that when forced into the ground, the root structure of the tree is severed and the spade segments meet to define a pod in which the root ball of the tree is disposed. Next, the user operates additional hydraulic cylinders which elevates the pod containing the tree and lays it on a truck bed in such a fashion that the pod and root ball is at the rear of the truck and the tree's branch structure extends over the vehicle's cab.

An important drawback inherent in the Stocker design is the fact that while the tree is being transported to a new location, its branches lay across the truck's cab. A such, for trees of a given maturity, this results in the branches being at a height which often exceeds road limitations. Where it is known that the route of travel will require the vehicle to pass under bridges, wires, and the like, it becomes necessary often to cut off or severely tie down the branches which usually causes breakage of said branches and could detract from the tree's ornamental appearance. The over-the-cab disposition of the tree branches also may obscure the driver's view. Trees that are transported with the branches laid over the cab usually extend more that three feet over the front bumper, which is illegal in most states. While it may be possible in some instances to tie down the tree branches so that existing height limitations will not be exceeded, this requires further manpower and effort and may also lead to undue damage to the tree being transported. The tree transplanting machine of the present invention obviates the foregoing problem.

SUMMARY OF THE INVENTION

In accordance with the teachings of the present invention, three pairs of hydraulic cylinders interact with the vehicle's frame, the pod mechanism and an articulated arm coupled between the vehicle frame and the pod to allow the pod containing the tree and root ball to be lifted vertically to the point where the bottom-most edges of the spades are above ground. Then, as the pod continues to be elevated, it is rotated in such a fashion that the pod lies on its side on the truck bed with the root ball facing the front of the vehicle and with the tree trunk and branches lying horizontally and pointing rearward.

The construction of the digging pod in the present invention is also quite different from the prior art as represented by the aforereferenced Stocker patent. Rather than utilizing a rack and pinion-type spade driving mechanism, it has been found expedient to instead utilize for each of the movable spades a ball-screw drive arrangement in which the screw member is adapted to be rotated by a suitable hydraulic motor. By coupling the hydraulic motor to the screw through a sprocket and chain drive mechanism, the motor may be disposed alongside of the screw so the overall height of the spade driving mechanism can be reduced to the point where it will usually not interfere with lower branches on the tree to be transplanted.

Digging pods of a variety of sizes may be used interchangeably with the vehicle and its lift mechanism. By simply removing four pins and uncoupling the hydraulic lines, a first pod may be detached, allowing one of a different size to be used.

DESCRIPTION OF THE PREFERRED EMBODIMENT

Figure 1:
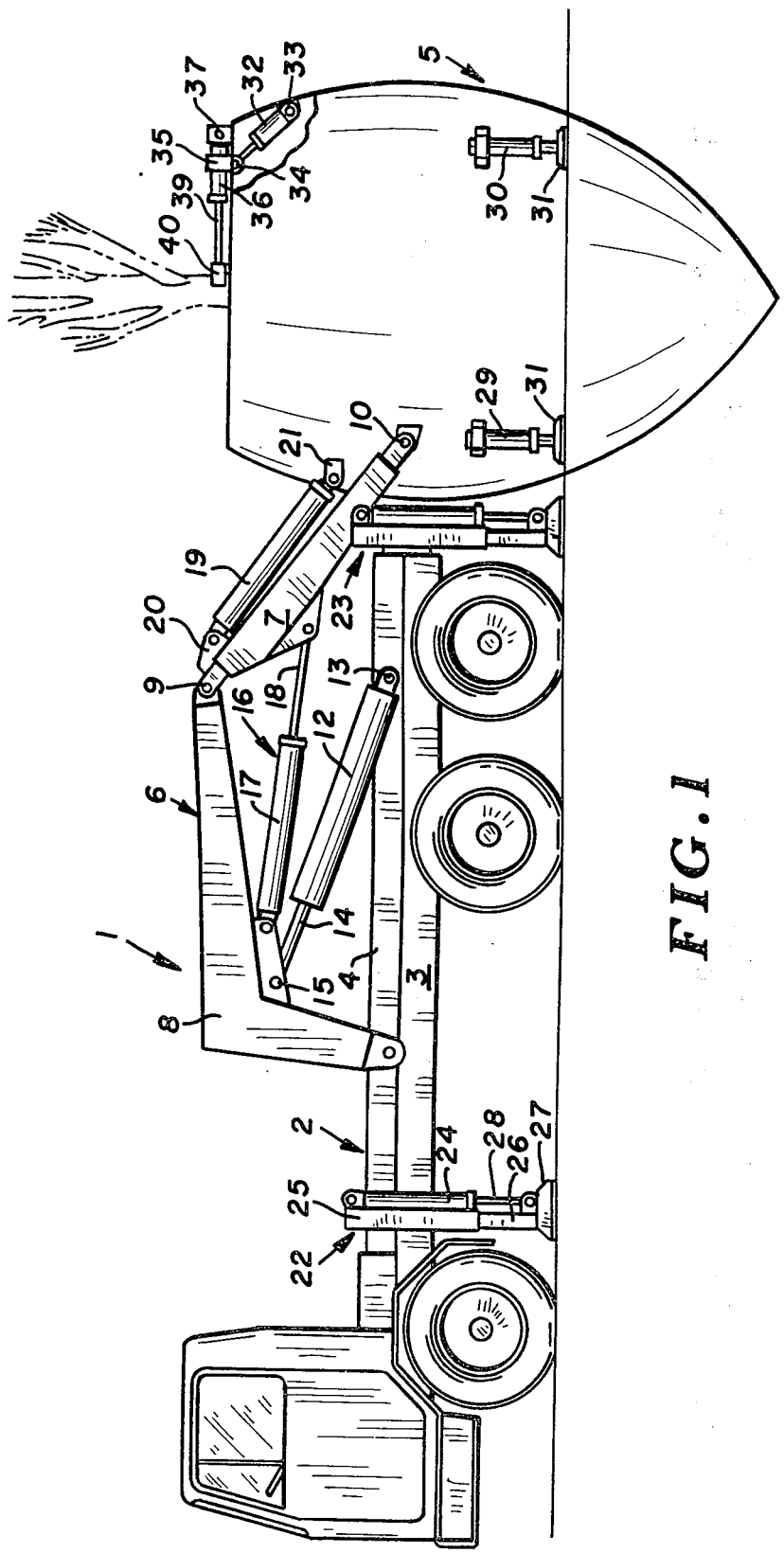
FIG. 1 is a side elevation view of a vehicle incorporating the preferred embodiment of the invention with the tree digging apparatus disposed in the ground.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology is intended to include the words above specifically mentioned, as well as derivatives thereof and words of similar import.

Referring first to FIG. 1, there is indicated generally by numeral 1 the tree-transplanting machine of the present invention. It comprises a truck-type vehicle 2 of conventional design and having a main frame member 3 supporting the subframe 4. The vehicle is arranged to transport a pod assembly which is indicated generally by numeral 5. To assist in the loading and unloading of the pod 5 is a hydraulically actuated, articulated, lifting arm 6 comprised of two linkages 7 and 8 which are joined together by means of a clevis pin 9 so that relative rotation of these two linkages may take place. The other end of the linkage 7 is pivotally coupled as as 10 to the pod assembly 5. The remaining end of the linkage 8 is, in turn, pivotally joined to the subframe of the truck vehicle as at 11.

Coupled between the truck'subframe 4 and the arm linkage 8 is a linear motor, here shown as a hydraulic cylinder/piston combination 12. One end of the cylinder 12 is pivotally joined to the subframe at 13, while the end of the piston rod 14 is pinned for rotation to the linkage 8 at 15. It is apparent that the cylinder/piston 12-14 as well as others of the hydraulic cylinder/piston combinations used in the machine may be inverted with the piston rod being coupled to the truck's subframe and the cylinder end being affixed to the linkage arm 8.

Extending between the lifting arm linkages 7 and 8 is a further linear motor 16 comprising a cylinder 17 and a piston rod 18 extending therefrom. Again, the cylinder 16 has its respective ends coupled to the arm linkages 7 and 8 by a pin connection which allows relative rotation between the parts. A third linear motor in the form of hydraulic cylinder/piston 19 is coupled between a clevis plate 20 attached to the articulated arm linkage 7 and a similar connection 21 affixed to the pod 5.

While the side elevation of FIG. 1 only illustrates a single hydraulically-operated pod loading and unloading mechanism on the driver's side of the vehicle, it is to be understood that a corresponding assembly is also joined to the passenger's side of the vehicle and that the corresponding pairs of hydraulic cylinders are coupled through suitable pressure-equalizing control valves known in the art so that mating pairs of the hydraulic actuators 12, 17 and 19 will operate in unison. Further, the load arms are connected together by bridging members (not shown).

To provide a desired stability when the tree-transplanting machine 1 is being used on uneven terrain, it has been found convenient to utilize front and rear outrigger assemblies indicated generally by numerals 22 and 23, respectively. Again, outriggers such as 22 and 23 are also provided on the passenger side of the vehicle. In the case of both the front and the rear outriggers, they are mounted on a suitable telescoping tube arrangement (not shown) which allows lateral positioning (extension) relative to the side of the truck's main frame 3. In that the outrigger assemblies 22 and 23 are substantially identical in construction, it is only necessary to describe one of them. With reference to the front left outrigger 22, it includes a linear actuator (hydraulic cylinder 24) which is joined at its upper end to the outrigger upright member 25. Member 25 comprises a segment of rectangular cross-section tubing which is attached to the lateral slide assembly (not shown). Telescopingly fitted within the outrigger upright 25 is a segment of rectangular cross-section tubing 26 of a smaller dimension and which has a outrigger shoe affixed at the lower end thereof. The actuator rod 28 of the hydraulic cylinder 24 is also coupled to the shoe 27 which allows controlled vertical movement of the outrigger assembly with respect to the ground. The outrigger upright member takes the side load off of the cylinder 24 and serves to prevent bending of the actuator rod thereof.

Next, with respect to the pod 5, it can be seen that a plurality of hydraulic actuators as at 29 and 30 are attached to its exterior. The cylinders have ground engaging shoes 31 affixed to their actuator rods. Again, while only two such linear actuators 29 and 30 are illustrated in FIG. 1, it is to be understood that others are provided around the periphery of the pod for providing a lifting force on the pod relative to the ground. As will be explained in greater detail, the cylinders 29 and 30 preferably have a relatively short stroke (typically 18 inches) and may appropriately be referred to as breakout cylinders in that they are used to effect an initial breaking of roots and disengagement of surrounding earth, as will be explained in greater detail herein below.

With continued reference to FIG. 1, identified by numeral 32 is a positioning cylinder which is affixed at one end 33 to the inside surface of a pod support member (not shown) and at its other end 34 to a collar 35 which is clamped to a further cylinder 36 termed the tree support cylinder. This cylinder has one end pivotally connected at 37 to a bracket 38 also affixed to the framework of the pod 5. Affixed to the piston rod 39 of the cylinder 36 is a generally semi-circular yoke 40. This arrangement of the positioning cylinder 32 and the tree support cylinder 36 can be used to orient the tree being dug with respect to the vertical and to provide a support to preventing shifting of the load when the pod is rotated during the loading of the pod onto the bed of the truck.

Figure 2:
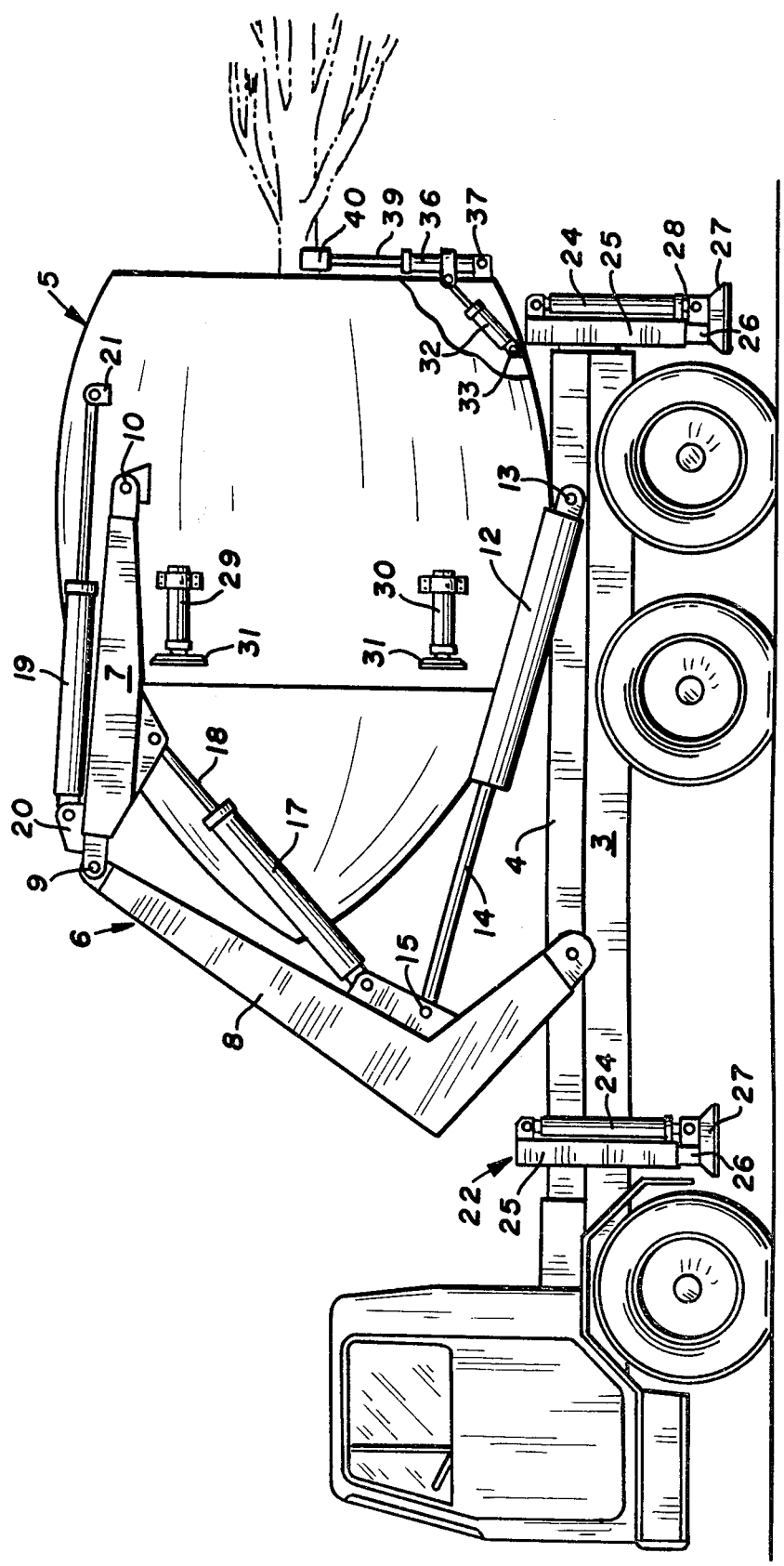
FIG. 2 is a corresponding side elevation showing the orientation of the digging apparatus when loaded on the vehicle body.

FIG. 2 illustrates the orientation of the pod relative to the truck bed when the pod and the tree which it contains has been loaded onto the truck bed for transportation. The parts in the view of FIG. 2 which correspond to those illustrated in FIG. 1 have been identified by the same numerals. While the manner in which the pod and its contents are loaded will be explained in greater detail herein below, for now it is sufficient to note that when the pod is loaded onto the bed of the truck, the tree trunk and its branches are directed rearward, whereas in the prior art, it has been conventional to lift the tree and pod onto the bed of the truck without rotating the pod so that the tree branches extend over the truck's cab.

Figure 3:
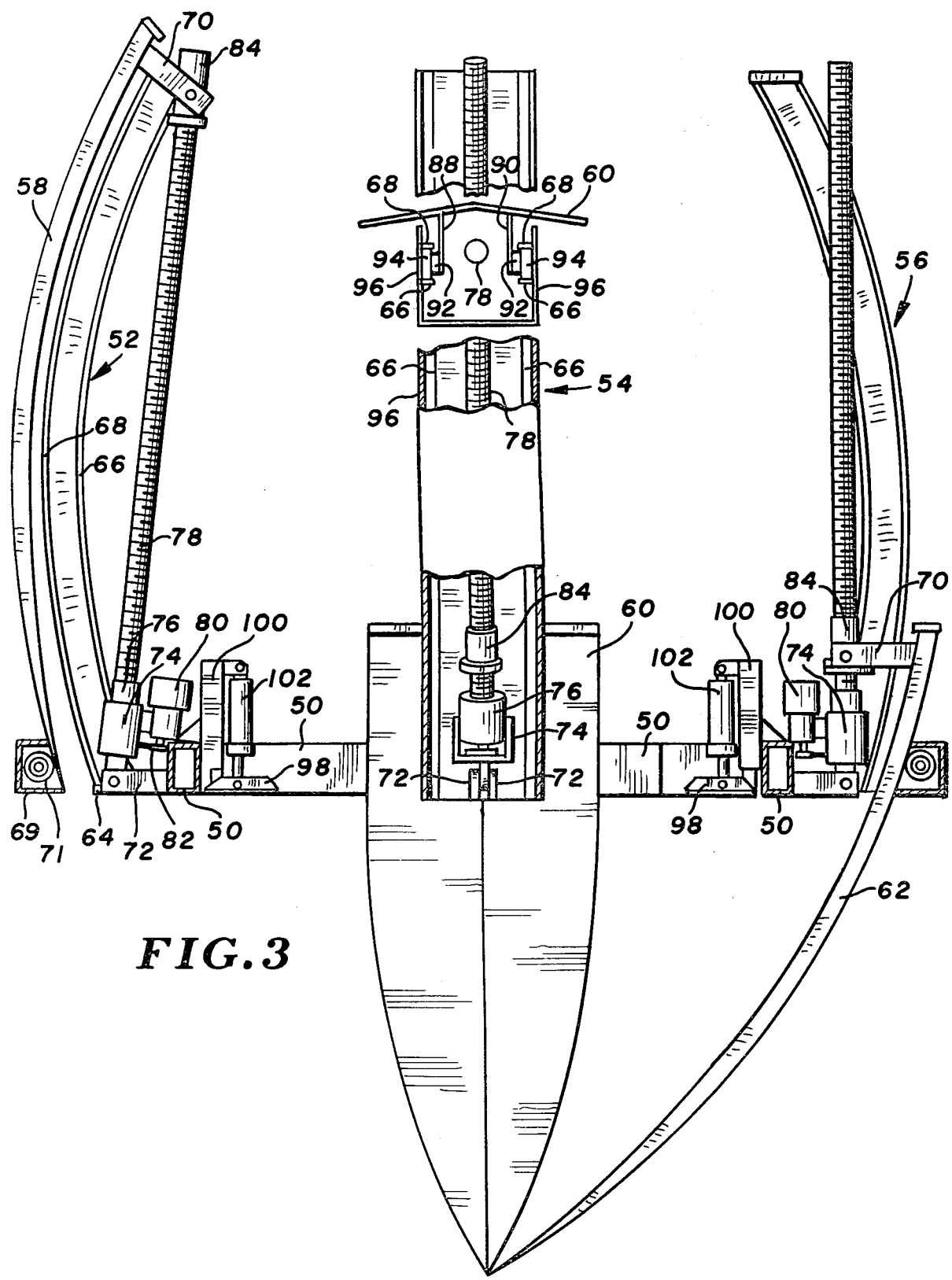
FIG. 3 is a cross-sectional view of the digging pod constructed in accordance with the present invention.

Before explaining the details of operation of the pod elevating mechanism, consideration will first be given to the constructional features of the pod itself and, in this regard, reference will be made to the view of FIG. 3. In this Figure, the pod assembly is shown as comprising a ring stand 50. The stand 50 is fabricated from steel plate in the form of a multi-sided polygon, one side for each spade member employed. The polygon is split on the side which faces the rear when deployed on the ground and is hinged on each side 90° from the opening side, such that the ring may be spread open to receive or fit about the tree to be transplanted. The ring stand 50 provides the framework or stand for a plurality of spade guide stanchions. There is one such stanchion for each spade assembly and, in the preferred embodiment, there may be ten such spade assemblies. Unlike the prior art, the machine of this invention can have variable or changeable pod sizes. In handling smaller trees, there may be only fourt spades in a pod, whereas for relatively large trees, the pod may include up to sixteen spades, for example. For convenience and ease of viewing, only three stanchion/spade assemblies are illustrated in FIG. 3 and are indicated generally by numerals 42, 54 and 56. Spade 58 is shown in its fully elevated, above-ground position, which spades 60 and 62 are illustrated in their fully extended, partially below-ground dispositions.

With reference to the stanchion 52, it can be seen that it is supported at the ground level by a boxed beam 64 which is welded to the outside perimeter of the ring stand member 50. Extending upwardly from the plate 64 are curved steel bars 66 and 68 which form a guideway for the reciprocating movement of the spade 58. The guide bars 66 and 68 are maintained in a parallel and spaced apart relationship by means of an upper spacer plate 70 to which the guide bars are welded.

Also welded to the base box beam 64 and the ring stand 50 are side brackets 72 and rotatably secured between these two brackets is a yoke assembly 74 which supports a bearing housing 76 into which a ball screw drive element 78 is journaled. The screw member 78 is adapted to be rotated by a hydraulic motor 80 which is affixed to the housing 76 and whose drive shaft is coupled through a sprocket/chain connection 82 to the screw. The movable ball nut 84 associated with the screw 78 is pivotally coupled to a bracket 70 which, in turn, is welded to the spade members. Thus, as the screw 78 is rotated, the ball nut 84 moves up or down relative to the screw (depending upon the direction of rotation of the screw itself) and, in doing so, carries the associated spade along with it.

With continued reference to FIG. 3 and especially to the partial cross-sectional view superimposed on the center assembly, which view has been rotated 90° to thereby reveal the details of the spade guide structure, it can be observed that these are welded to the spades's steel brackets 88 and 90 and attached to each of these brackets is a spacer 92. The spacers 92 maintain a predetermined distance between rollers 94 and their associated roller support bracket 88–90. These rollers, in turn, cooperate with the front and rear guide bars 66 and 68 as the spades are raised and lowered by means of the hydraulic motor-driven lead screw.

Each of the spade guide stanchions includes a three-sided channel 96 which serves as a shield or cover about the screw mechanism and the associated guide bars and guide rollers. For ease of viewing, the cover 96 is omitted from the stanchion assemblies 52 and 56, but is shown in broken-away form on the center stanchion assembly 54.

The individual spades are curved, shaped and positioned relative to the ring stand 50 such that when each of the spades is forced through the earth to its lowermost position the edges thereof abut one another and form an inverted hollow cone. While in motion, the individual spades cooperate with one another to isolate a root ball consisting of the tree roots and a quantity of earth surrounding and adhering to these roots.

To hold the earth tightly compacted around the trees root structure, it has been found convenient to employ a plurality of hold-down pads as at 98. More specifically, there are affixed to the split ring stand 50 at predetermined radial locations, a bracket assembly, as at 100, which support hydraulic cylinders 102 whose actuator rods are coupled to the hold-down shoes 98. By applying the hydraulic fluid under pressure to the cylinders 102, the shoes 98 may be forced against the earth ball so as to hold the ball tightly compacted as the pod is being elevated and tipped onto the truck bed.

While those skilled in the art will readily be able to design and construct an embodiment of the present invention from the details of the preferred embodiment set forth herein, it is deemed helpful to mention that the break-out cylinders, including cylinders 29 and 30, are preferably 4-inch diameter units which together are capable of developing a lifting force of about 100,000 lbs. when the hydraulic pressure is maintained at 2,000 psi. The cylinders 17 and 19 may typically each be 6-inches in diameter and having a 40-inch stroke and with hydraulic pressure maintained at 2,000 psi will generate approximately 56,548 lbs. of force. The main lifting cylinders 12 may be 8-inches in diameter and have a stroke of approximately 48-inches. Again, assuming the hydraulic pressure in the system to be at approximately 2,000 psi, the lifting cylinders 12 are capable of generating a force of approximately 100,531 lbs. each.

A ball-screw arrangement suitable for use as the spade drivers in the present invention may typically be a 2½-inch screw of the type manufactured and sold by the Warner Company (of Beloit, Wis.) generating a thrust force of approximately 38,000 lbs. each.

Now that the details of the construction of the present invention have been set forth, consideration will be given to its mode of operation.

OPERATION

To prepare to transplant a tree, the operator selects an appropriate pod size for the size of the tree to be moved and couples it to the vehicle by clevis connections 10 and 21. At this time, the hydraulic fluid lines are coupled to the appropriate connections on the pod as well. Next, the vehicle of the present invention is driven to the site where the new tree is to be planted. If the terrain should be uneven, the operator, upon parking the vehicle, will appropriately laterally extend the outrigger assemblies and will then energize the hydraulic cylinders 24 to bring the shoes 27 firmly against the ground and to lift one side of the truck from the ground to maintain a horizontal disposition to the truck frame 3.

Once the vehicle is leveled and stabilized through the use of the front and rear outrigger assemblies, the operator, through appropriate hydraulic controls, will retract the actuator rod 14 while extending the actuator rod 18 from their respective cylinders. The conjoint operation of the hydraulic cylinders 12 and 17 will cause the pod to be elevated relative to the truck bed as shown in FIG. 2 and once so elevated, the operator will retract the hydraulic cylinder 19, which causes the pod to rotate in the counterclockwise direction when viewed in FIG. 2. Through proper manipulation of the aforementioned hydraulic actuators 12, 17 and 19, the operator will set the pod assembly 5 onto the ground at the point where the hole for the new tree is to be dug.

Following that, the operator will selectively energize the hydraulic motors 80 associated with the spade drive screw mechanism 78. By rotating the screw, the ball nut 84 will move downward relative to the axis of the screw and, in doing so, will force the curved spade members 58, 60 or 62 into the earth. Because of the pivot connection of the screw assembly relative to the stanchion, the screw is free to assume a position dictated by the location of the blade being driven. As is suggested by the drawings themselves, the curved blades are made to traverse a correspondingly curved path by virtue of the rollers 94 which cooperate with the curvilinear guide bars 66 and 68. Once all of the blades have been lowered, a volume of dirt will be isolated from the surrounding earth and will be contained in the pod. The operator next raises the pod by actuating the cylinder 12 which functions to rotate the lift arm 6 about the pivot point 11. At the same time, he manipulates the hydraulic cylinder 17 cooperating with the arm segment 7 to maintain the pod in a generally vertical orientation. When the pod has cleared the ground, the operator may move the vehicle to transport the dirt to a desired location, leaving the hole for the tree to be planted in.

Next, the operator will drive the vehicle to the site where the tree to be transplanted is located and will appropriately position the outriggers to accommodate the terrain. Again, positioning the pod at the rear of the truck and in a generally vertical orientation, he will operate hydraulic cylinders (not shown) for opening the split ring stand so as to allow the ring to be placed about the tree. When the tree is centrally disposed within the ring stand, the operator again operates the ring splitting cylinder to cause the ring stand to close and latch by means of a separate latch cylinder (not shown). The process is again repeated whereby the spade members 58, 60 and 62, as well as all others, are forced into the ground by their respective lead screw drive arrangements. The force of approximately 38,000 lbs. applied to the spades is sufficient to force them through the ground as well as through any roots and the like which may be in their path of descent. Once all of the spades have been lowered, the operator will next actuate the break-out cylinders 29 and 30 disposed about the periphery of the pod. The lifting force is sufficient to break the dirt and roots free from the surrounding earth. At this time, the operator will also activate the positioning cylinder 32 and the tree support cylinder 36 so that the yoke 40 will properly center and stabilize the trunk of the tree relative to the pod. He will also at this time energize the earth-holding cylinders 102 whereby the flat pads 98 will be held tightly against the surface of the ground compressing the dirt contained within the pod.

Following these preliminary operations, the operator next will actuate the linear motors 12, 17 and 19 to thereby first lift the pod completely free from the ground and then he will rotate the pod 90° from the horizontal in a clockwise direction (when viewed in FIG. 1) as the pod is lowered onto the bed of the truck. As the tree moves off from its vertical orientation, it is centrally held within the pod by virtue of the tree support cylinder arrangement 36. As the center of mass of the load becomes displaced from the vertical, the cylinder 19 is used to provide a pulling force to prevent the weight of the tree from freely tipping the pod about the pivot point 10.

Once the pod with its contents is loaded onto the truck bed, the operator will retract the outriggers by lifting the shoes 27 from the ground, and moving them laterally in their slide support (not shown) toward the sides of the truck.

In that the tree trunk and branches are pointing rearward, they maintain a substantially lower profile than would be obtainable with prior art devices which all leave the tree and branches positioned above the cab of the truck. Accordingly, the need for over-size load road permits or the like to legally transport the tree is obviated, except for the largest or over-sized pods.

The operator will drive his load to the site which he previously prepared and will back up to the hole. Again, by manipulating the hydraulic cylinders 12, 17 and 19, he is able to raise the pod from the bed of the truck, rotate it 90° in a counter-clockwise direction (as viewed in FIG. 2) and to lower it into the previously prepared hole. Once the pod with the tree in it is lowered into the hole, the operator again energizes the hydraulic motors 80 in a direction to cause the ball nut to ride up its associated screw 78. In doing so, the spades are carried upward along the path defined by their associated guides and the tree is left standing in the hole that had been prepared for it. The earth-holding shoes 98 are retracted and the tree support yoke 40 is withdrawn by actuation of the cylinder 36. Similarly, the cylinder 32 is operated to swing the tree support cylinder out of the way. Additionally, the opening and closing of the pod is repeated.

The operator may again manipulate the lift arm 6 through appropriate operation of the cylinders 12 and 17 and the cylinder 19 to load the pod on its side on the bed of the truck and retract the outriggers so that the machine can be moved to a new site where a tree is to be planted and the sequence would then be repeated.

The invention has been described herein in considerable detail, in order to comply with the patent statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

We claim:

1. A tree transplating machine comprising in combination:
   (a) a truck-type vehicle having a wheel supported frame defining a truck bed;
   (b) a tree digging pod having a plurality of spade members reciprocally movable with respect to a toroidal, tree-encircling stand, the spade members being shaped and positioned relative to one another such that when extended relative to such stand, they encase a volume of earth, said pod being positionable between a first disposition wherein said pod is at least partially disposed in the ground and a second disposition on said truck bed;
   (c) articulated arm members having first and second segments pivotally coupled together, said first segment being pivotally attached at one end thereof to said frame on opposed sides of said vehicle, said second segment being pivotally attached to said pod at the other end thereof;
   (d) first linear motor means coupled between said frame and said articulated arm members for rotating said arm members relative to said frame;
   (e) second linear motor means coupled between said articulated arm members and said pod for controlling the rotation of said pod relative to said arm members; and
   (f) third linear motor means coupled between said first and second segments of said articulated arm members, or rotating said pod substantially 90° with the upper end of said pod oriented rearward relative to said truck frame following activation of said first and second linear motor means by which said pod is elevated substantially vertically a predetermined distance above ground level.

2. The tree transplanting machine as in claim 1 and further including means disposed in said pod for supporting a tree trunk in a generally horizontal position when said pod is in said second disposition.

3. The tree transplanting machine as in claim 1 and further including a plurality of linear motors attached to the exterior of said pod at radially spaced positions and at a distance above ground level when said pod is in said first disposition and which, when actuated, provide a lifting force to said pod for breaking the root ball free from surrounding earth.

4. The tree transplanting machine as in claim 1 wherein said tree digging pod comprises:
   (a) a split ring stand adapted to be positioned in encircling relationship to a tree to be moved;
   (b) a plurality of spade guiding stanchions affixed to said ring stand at predetermined radial positions, said stanchions projecting generally upwardly from said ring stand when said ring stand is in a horizontal disposition;

(c) a plurality of spades slidingly coupled to said spade guiding stanchions; and (d) hydraulically driven screw means secured to said ring stand and drivingly coupled to said spades for imparting reciprocating motion thereto.

5. The tree transplanting machine as in claim 4 wherein said hydraulically driven screw means comprises:

(a) a plurality of elongated lead screws each having a ball nut threaded thereon, said ball nuts being individually connected to said spade;

(b) a plurality of hydraulic motors, each having a rotatable shaft and each individually associated with said elongated lead screw; and (c) coupling means for connecting said rotatable shafts to said elongated lead screws.

6. The tree transplanting machine as in claim 5 wherein said coupling means comprises a chain and sprocket and wherein said hydraulic motors are disposed in a generally parallel relationship with respect to said elongated lead screws.

* * * * *

UNITED STATES PATENT AND TRADEMARK OFFICE
CERTIFICATE OF CORRECTION

PATENT NO. : 4,417,416
DATED : November 29, 1983
INVENTOR(S) : Clifton E. Johnson It is certified that error appears in the above-identified patent and that said Letters Patent are hereby corrected as shown below:

Title Page, Column 1, line 2, delete "Johnson" and put instead -- Halla, et al --.

Title Page, Column 1, line 4, before "Clifton", insert -- David M. Halla, Chaska, MN; --.

Title Page, Column 1, line 5, delete "N. Mex." and put instead -- MN --.

Column 8, line 45, Claim 1(f), delete "or" and put instead -- for --.

Signed and Sealed this

Twenty-fourth Day of January 1984

[SEAL]

Attest:

GERALD J. MOSSINGHOFF

*Attesting Officer*  *Commissioner of Patents and Trademarks*